INVENTOR
THOMAS W. WINSTEAD

BY Raphael Semmes
ATTORNEY

INVENTOR
THOMAS W. WINSTEAD

Nov. 25, 1969  T. W. WINSTEAD  3,479,694
CONTINUOUS METHOD AND APPARATUS FOR MANUFACTURING
ARTICLES FROM FOAMED THERMOPLASTIC MATERIAL
Filed Aug. 19, 1965  12 Sheets-Sheet 7

INVENTOR
THOMAS W. WINSTEAD

BY  Raphael Semmes

ATTORNEY

Nov. 25, 1969  T. W. WINSTEAD  3,479,694
CONTINUOUS METHOD AND APPARATUS FOR MANUFACTURING
ARTICLES FROM FOAMED THERMOPLASTIC MATERIAL
Filed Aug. 19, 1965  12 Sheets-Sheet 8

INVENTOR
THOMAS W. WINSTEAD
BY Raphael Semmes
ATTORNEY

Nov. 25, 1969 T. W. WINSTEAD 3,479,694
CONTINUOUS METHOD AND APPARATUS FOR MANUFACTURING
ARTICLES FROM FOAMED THERMOPLASTIC MATERIAL
Filed Aug. 19, 1965 12 Sheets-Sheet 10

INVENTOR
THOMAS W. WINSTEAD

BY Raphael Semmes

ATTORNEY

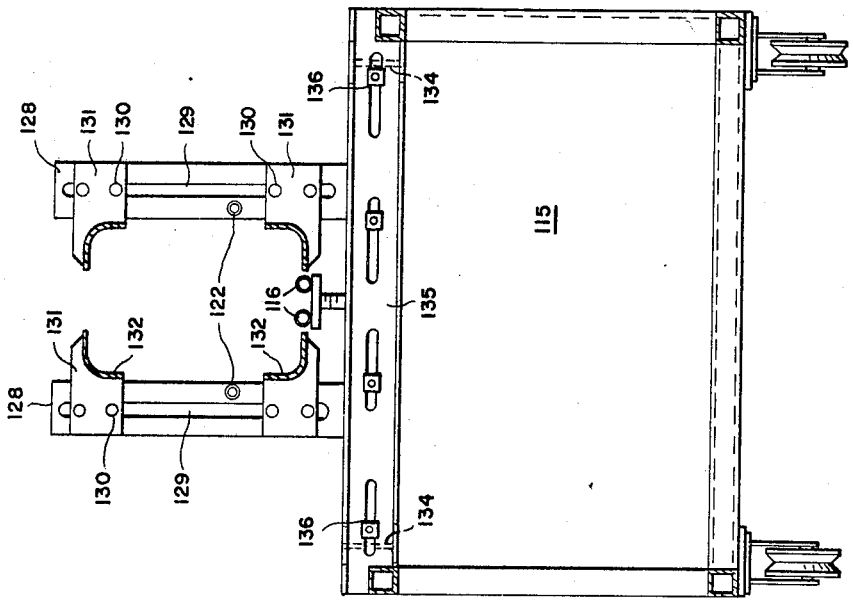
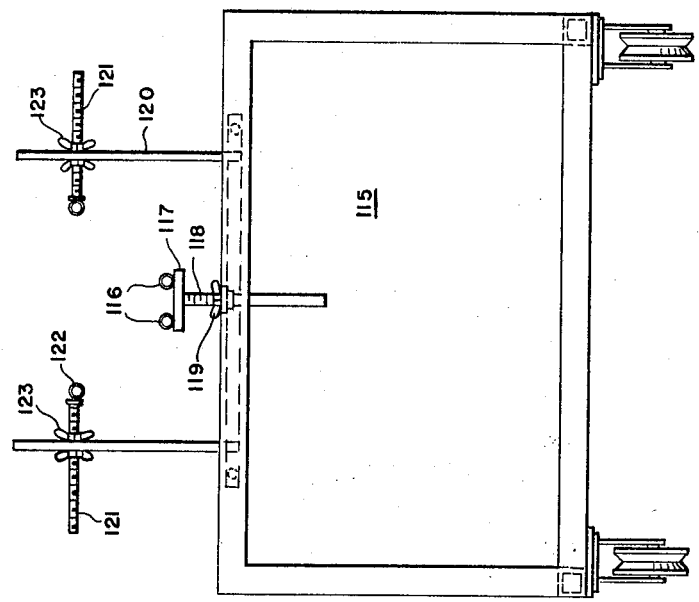

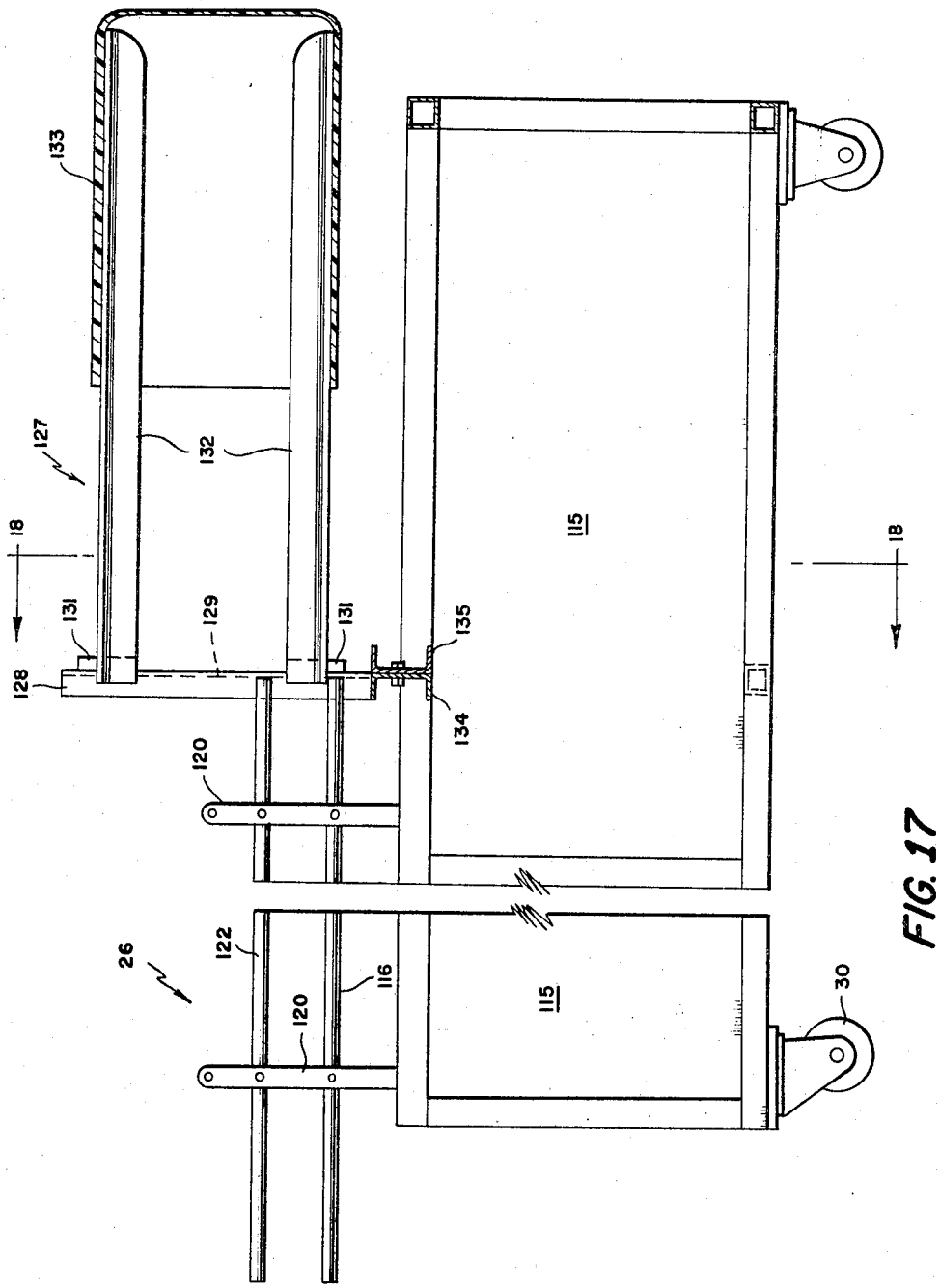

United States Patent Office 3,479,694
Patented Nov. 25, 1969

3,479,694
CONTINUOUS METHOD AND APPARATUS FOR MANUFACTURING ARTICLES FROM FOAMED THERMOPLASTIC MATERIAL
Thomas W. Winstead, Baltimore, Md.
(Williamson Lane, Cockeysville, Md. 21030)
Filed Aug. 19, 1965, Ser. No. 480,917
Int. Cl. B29c 17/00, 17/14
U.S. Cl. 18—19                                5 Claims

ABSTRACT OF THE DISCLOSURE

Integrated apparatus for continuously extruding foamed thermoplastic sheets and manufacturing therefrom three-dimensional articles. The apparatus has means for first spreading the extruded and expanding sheets, vacuum-forming articles therefrom on the periphery of a forming wheel, severing the formed articles, conducting the severed articles to a stacking means, packaging the articles, and returning the selvage for re-use. The operation of the extrusion device, forming wheel, severing device, stacking means and packaging means are all coordinated to provide a continuous, integrated system.

---

This invention relates to a method and apparatus for forming and cutting plastic articles, and consists more particularly in a continuous, integrated system for the manufacture of formed articles from foamed or cellular thermoplastics.

Conventionally, in making formed articles from foamed thermoplastics, a multiple stage method and apparatus have been employed. First, foamed sheeting has been extruded and collected on rolls which have been stored until ready for use in a sheet-forming machine which reheats the material on a progressive basis and forms it into molds by the use of differential air pressure, plungers, or both. After forming, the web is transferred to a cutting machine which severs the formed articles from the selvage. In other words, the extrusion operation, the forming operation, and the cutting operation require entirely separate steps and machinery, and although this system has been satisfactory in certain respects, it has many limitations affecting cost, quality control and operational control.

For example, with the conventional multiple stage operation, the following disadvantages and limitations are noted:

(1) Considerably more floor space is required for the multiple steps and machinery than is required for an integrated system.

(2) Because of the usual "blown bubble" method used in producing the sheet, it is very difficult to produce low density material of good quality, and this naturally affects cost.

(3) Because of the separation of the extrusion and fabricating operations, quality control becomes more difficult and costly; a considerable amount of sheeting may be made for subsequent forming with defects which are not detected until the forming operation is begun, at which time it is too late to take corrective measures. This naturally results in the rejection of large quantities of material.

(4) Since foam sheeting has excellent thermal insulating properties, it is difficult and costly from an energy standpoint to heat it properly and uniformly during the fabrication step.

(5) With certain types of thermoplastic foam sheeting, there is a period of aging during which volatiles used in the foaming process are evolved and replaced by air. Therefore, careful attention must be paid to the time when the re-heating takes place during the fabricating step, because the residual content of the volatile can have an appreciable effect on the final density of the product, necessitating operational controls which further complicate the process.

(6) Because of the difficulties in obtaining uniform heat and because of the necessity of waiting until a large percentage of the volatiles have evolved from the material, it is not possible to form such foamed sheeting as readily or as deeply as would otherwise be the case.

(7) A multiple stage process is always more difficult to automate and necessarily requires more manpower than for an integrated process, which again affects costs adversely.

It is therefore the primary object of the present invention to provide an integrated system for continuously extruding, forming and cutting plastic articles of foamed or cellular material and to thereby overcome the disadvantages and limitations inherent in conventional methods.

Another object is to provide a method and apparatus of this nature wherein the individual steps and apparatus involved in the integrated system are coordinated for the proper sequential operation, both with respect to time and the geometry of the system to produce foamed plastic articles of high quality.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views:

FIG. 16 is a feeding end elevation of the packaging unit;

FIG. 17 is a view of the same in side elevation; and

FIG. 18 is the delivery end elevation.

Figure 1:
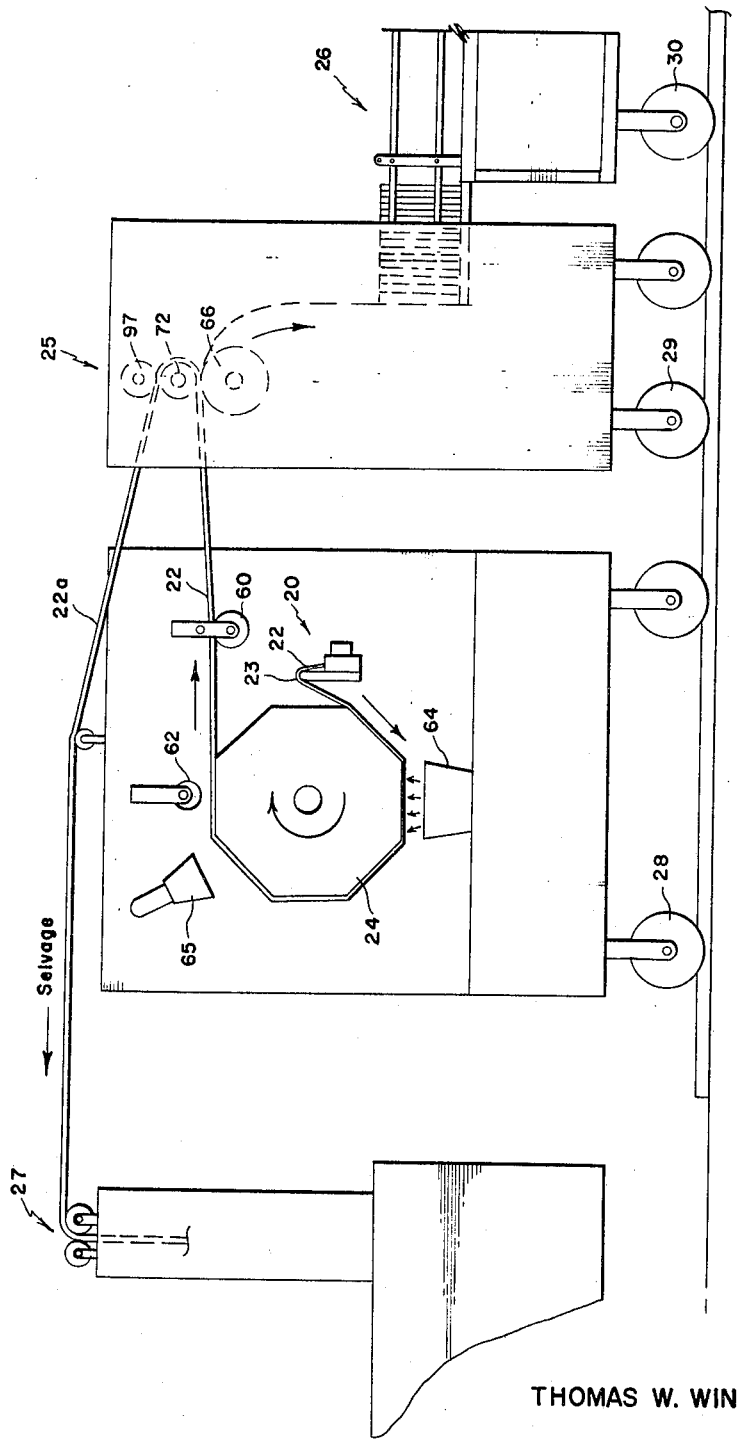
FIG. 1 is a schematic view illustrating the integrated system of the invention.

Referring first to FIG. 1, the integrated system includes an extrusion device generally indicated at 20, which is preferably, but not necessarily, of the type shown and described in my copending application Ser. No. 475,734, filed July 29, 1965. Here, an expandible thermoplastic material incorporating suitable blowing agents is extruded through a die, forming a continuous thermoplastic strip or sheet 22. The sheet 22 travels over a spreading yoke 23, also shown in my said copending application, from which it is conducted around the periphery of a forming wheel 24 which vacuum forms the articles on the sheet 22.

By sequential valving, to be described, the vacuum is applied to the successive molds on the forming wheel 24 as the sheet 22 is tangent to the respective flat faces of the forming wheel and after the sheet has been flattened and stretched by the spreading yoke 23.

The formed articles, while still carried by the sheet 22, are then stripped tangentially from the upper side of the forming wheel and the sheet and articles are conducted to the cutting unit 25 where the formed articles are removed from the sheet and directed to a stacking unit 26. The remaining selvage 22a is thereupon conducted to a granulating machine 27 which automatically divides it into fine particles, after which it is fed back into the extrusion equipment.

In order to facilitate the sequential operation of the integrated units of the system and to insure proper spacing of said units, the forming wheel unit 24, the cutting unit 25 and the stacking unit 26 are mounted on suitable wheels or rollers 28, 29 and 30 respectively which may run on tracks, as shown. It should also be pointed out that as distinguished from some of the conventional extruding and forming systems, wherein a relatively wide sheet of plastic is extruded so as to provide a web width which will accommodate a large number of cavities when formed, the present invention contemplates the extrusion of narrow strips. The difficulties of removing corrugations from an extruded wide flat sheet of expandible thermoplastic material after emergence from the die are almost insurmountable in very low density foams, such, for example, as those under 3 lbs. per cubic foot. Also, the slow linear speed generally associated with wide webs inherently includes a time element which is particularly detrimental to subsequent forming of foam materials from sheet. Because of the cooling effect upon expansion immediately after emergence from the die orifice, it is desirable to form the material within the shortest possible interval of time. A narrow web of the order of 12" or less in width reduces this time increment and also minimizes heat loss from the material, which obviously seriously affects formability. Since both quality and formability are significantly improved through the use of narrow strips rather than wider sheeting, this is considered a basic concept in the development of the present method.

For a given pounds-per-hour of output, there can actually be determined maximum practical widths which, if exceeded, will preclude quality forming of articles, assuming all other variables remain constant. In certain extrudable foams, such as styrene, frequently volatile blowing agents are used which have a certain plasticizing effect on the polymer. Since a high percentage of such ingredients are evolved, again within a short time interval after leaving the die orifice, it is only by extruding narrow strips at extremely high linear rates that the beneficial plasticizing effects can be attained during the forming step. This narrow strip concept and high linear rate with respect to time offers a method which is not possible by other means. The narrow strip concept minimizes the problem of corrugations and spreading of the material as it expands after emergengence from the die orifice; it minimizes the loss of heat content which is inherently so rapid in an expanding foam extrudate; it minimizes the loss of volatiles which have a beneficial plasticizing effect; and, as a result, it maximizes the capability of making low density, deep drawn articles of high quality at low cost.

As seen in FIGS. 2–5, the forming wheel 24 comprises a series of flat, peripherally mounted molds 31, which, in the embodiment illustrated, jointly form a wheel of octagonal periphery. These molds are supported on a wheel disc 32 by suitable screw-threaded fixtures 33 (FIGS. 4 and 5) engaging cross bars 33a, fixed to the outer edge of disc 32. By means of these fixtures, the individual molds may also be radially adjusted on the disc for proper positioning relative to one another. The disc 32 is keyed to a rotatable shaft 34 so as to rotate therewith and is held in place on the shaft by a bolt 35 and plate 36.

The shaft 34 is mounted in cantilever (FIG. 3) and rotatably supported by bearings 37 and is driven by a sprocket 38 and chain 39 from a drive sprocket (not shown) mounted on a motor drive unit 40. This motor drive unit is a variable speed unit of conventional type with suitable control for varying the speed of the forming wheel 24.

Figure 5:
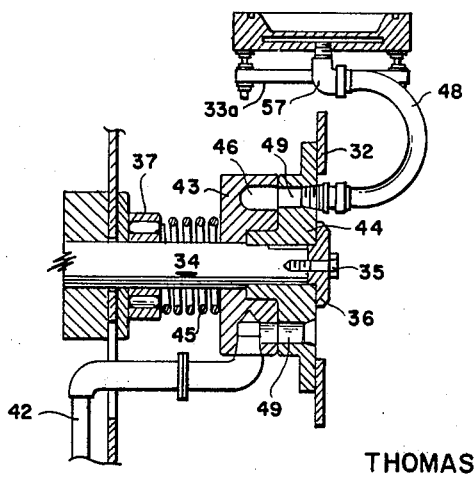
FIG. 5 is a sectional view taken on line 5—5 of FIG. 4, illustrating the mold structure.
Figures 9, 10:
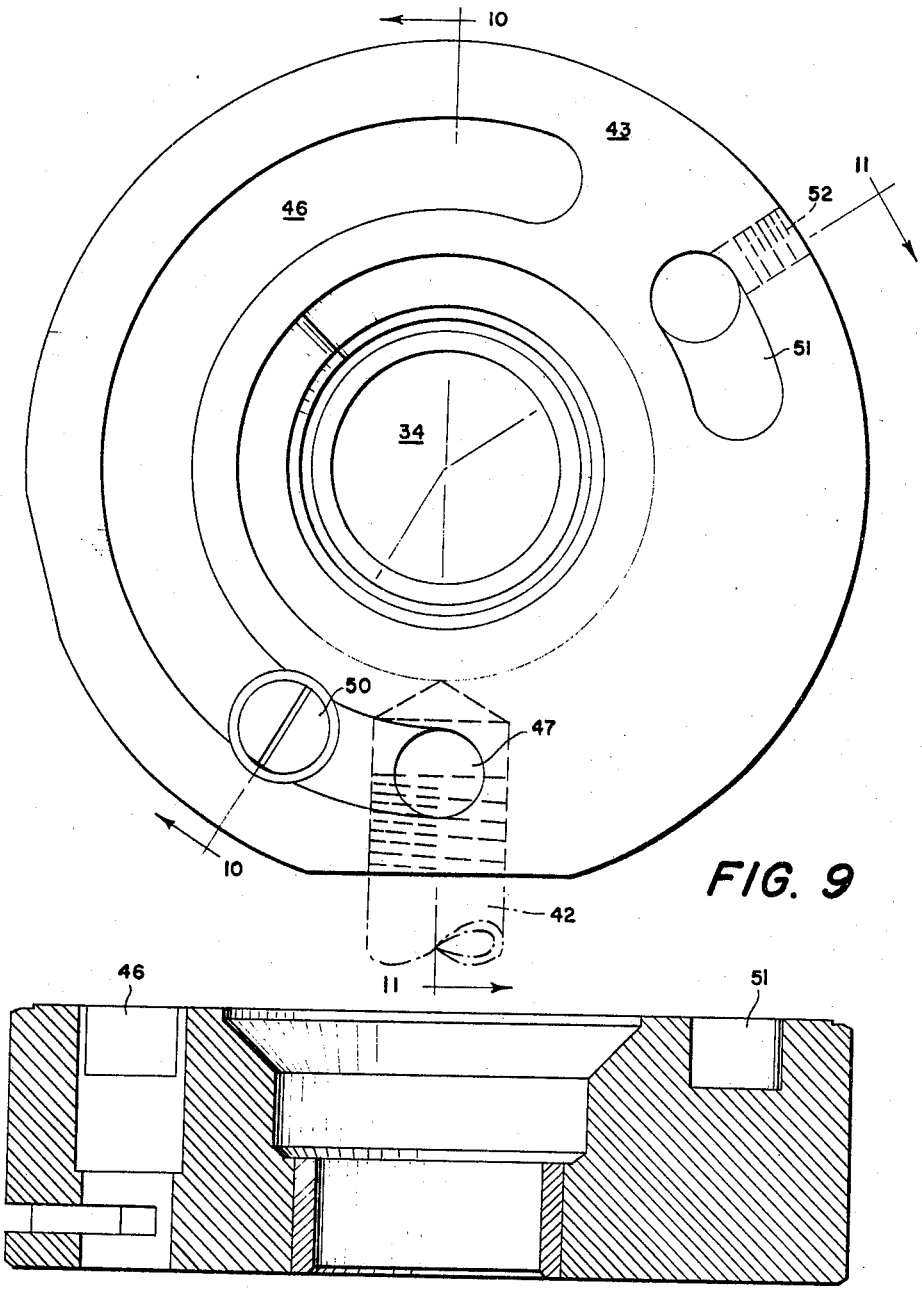
FIG. 9 is a plan view of the vacuum control manifold valve plate.
FIG. 10 is a sectional view taken on line 10—10 of FIG. 9.

The vacuum forming system for the wheel 24 comprises a vacuum pump 41 which creates suction in the connecting pipe or hose 42, connected to the manifold plate 43, shown in detail in FIGS. 9 and 10 and hereinafter referred to. As seen in FIG. 5, the manifold plate 43 is held in intimate contact with the hub 44 of the forming wheel 24 by a spring 45 interposed between the inner bearing 37 and the outer face of the manifold plate and forces the latter against the forming wheel hub 44.

Figure 4:
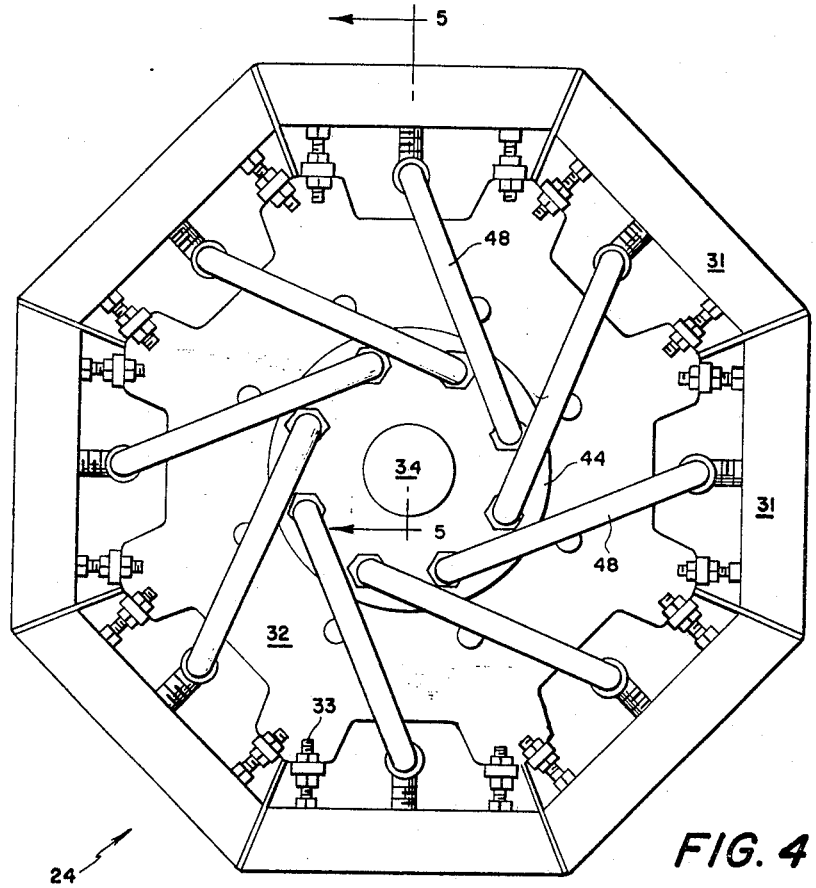
FIG. 4 is an enlarged side elevation of the forming wheel.

The manifold plate 43 is, of course, held stationary by tube 42 while the hub 44 rotates with the shaft 34. As seen in FIG. 9, the manifold plate 43 is provided with a relatively long, arcuate slot 46, one end of which communicates with the suction pipe 42 as at 47. As shown in FIGS. 4 and 5, each of the vacuum molds 31 on the periphery of the wheel 24 is connected by a pipe 48 to a corresponding port 49 in the hub 44. Thus, as the hub rotates, each port 49 sequentially comes to a position on the manifold plate where the arcuate slot 46 begins to cover the port, thus creating a vacuum within the mold cavity. As the hub and wheel continue to rotate, the slot 46 maintains the vacuum with a number of successive molds on the wheel over a large percentage of a full revolution, and when the end of the slot is reached, the vacuum is cut off.

Preferably, a valve 50 leading to one end of the slot 46 is employed to permit the maintenance of a good vacuum on start-up. This valve is maintained in closed position until sufficient vacuum has been established, whereupon it is opened as initial vacuum is established in all of the molds communicating with the slot 46.

A second, shorter arcuate slot 51 is connected to an air source at 52 which, in proper sequence, communicates with each mold cavity and thereby ejects the finished product from the cavity, as will later appear.

The molds 31 are identical, and a description of one will suffice for all. As seen in FIGS. 5–8, each mold is provided with a suitably shaped mold cavity 53 communicating through appropriately spaced vacuum ports 54 with a vacuum chamber 55 formed in the body of the mold.

Figure 6:
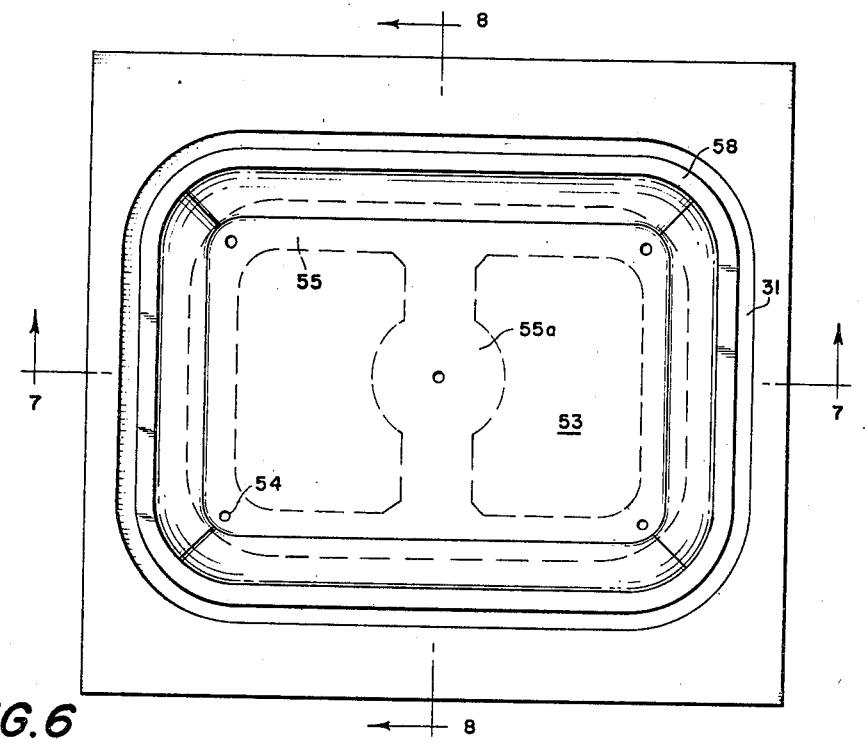
FIG. 6 is a further enlarged plan view of a mold.
Figure 7:
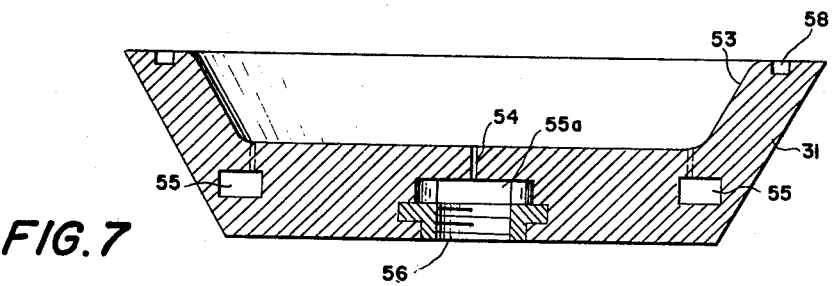
FIG. 7 is a sectional view taken on line 7—7 of FIG. 6.
Figure 8:
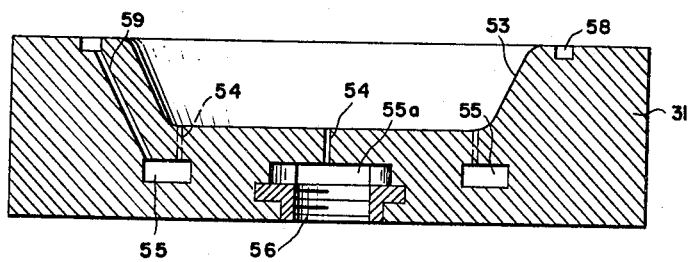
FIG. 8 is a similar view taken on line 8—8 of FIG. 6.

As best seen in FIG. 6, the vacuum chamber 55 is in the form of an endless channel extending around the bottom wall of the mold and connected crosswise by a central channel 55a, thus equally distributing the vacuum created in the chamber. The cross channel 55a is provided with a threaded insert 56 by means of which it is operatively connected to a coupling 57 carried on the end of the respective vacuum hose 48. Preferably, the insert 56 is cast in the mold during its forming.

In order to hold and seal the thermoplastic sheet around the entire periphery of the cavity 53 during the forming operation, a vacuum groove 58 is provided in the top surface of the upper edge of the mold wall. This channel communicates with the vacuum chamber 55 by a passageway 59. This sealing operation may be effected prior to or simultaneous with the application of vacuum to the main mold cavity 53 by means of the vacuum pump 41 so that the vacuum groove is first evacuated and clamps the edges of the sheet completely around the cavity, holding them firmly during the subsequent drawing of material into the cavity itself. The sequencing of these two steps may be accomplished in one of several ways. It is most easily accomplished by relatively restricting flow from the cavity while maximizing flow from the vacuum groove 58 itself. This precludes the need for complicated channeling and valving. However, the clamping groove and the cavity may actually be segregated from one another and separately valved in sequence. It may also be noted that the vacuum groove 58 may be a continuous groove or it may comprise a series of suitably spaced vacuum grooves extending around the upper edge of the mold 31.

As previously indicated, the manifold plate 43 is provided with a short arcuate slot 51 connected to an air source at 52. This slot 51 communicates with each mold cavity through vacuum chamber 55 in proper sequence as the hub 44 rotates relative to the manifold plate and thereby ejects the finished product from the cavity at the proper time.

Figure 2:
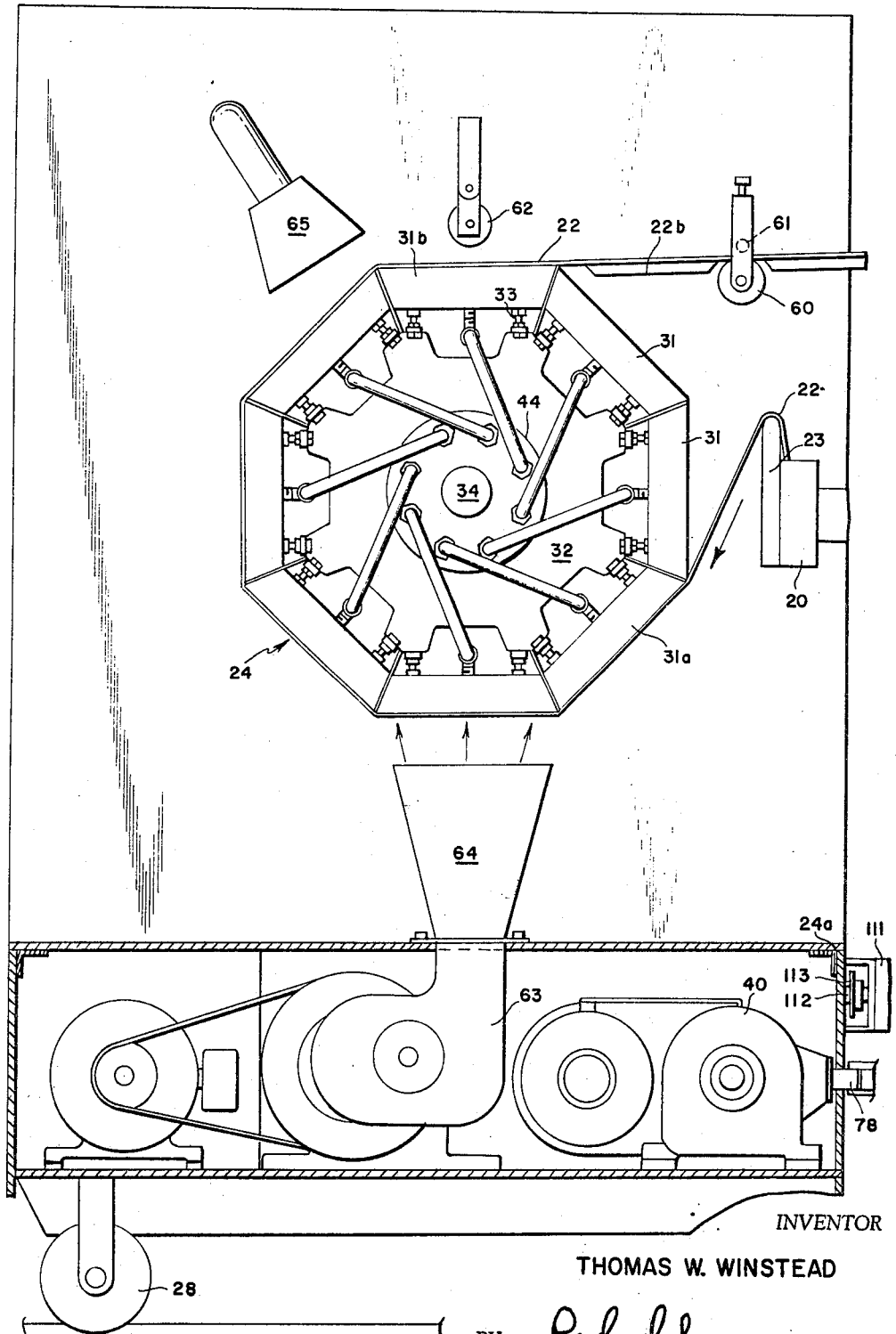
FIG. 2 is an elevational view partially in section illustrating the forming wheel unit.
Figure 3:
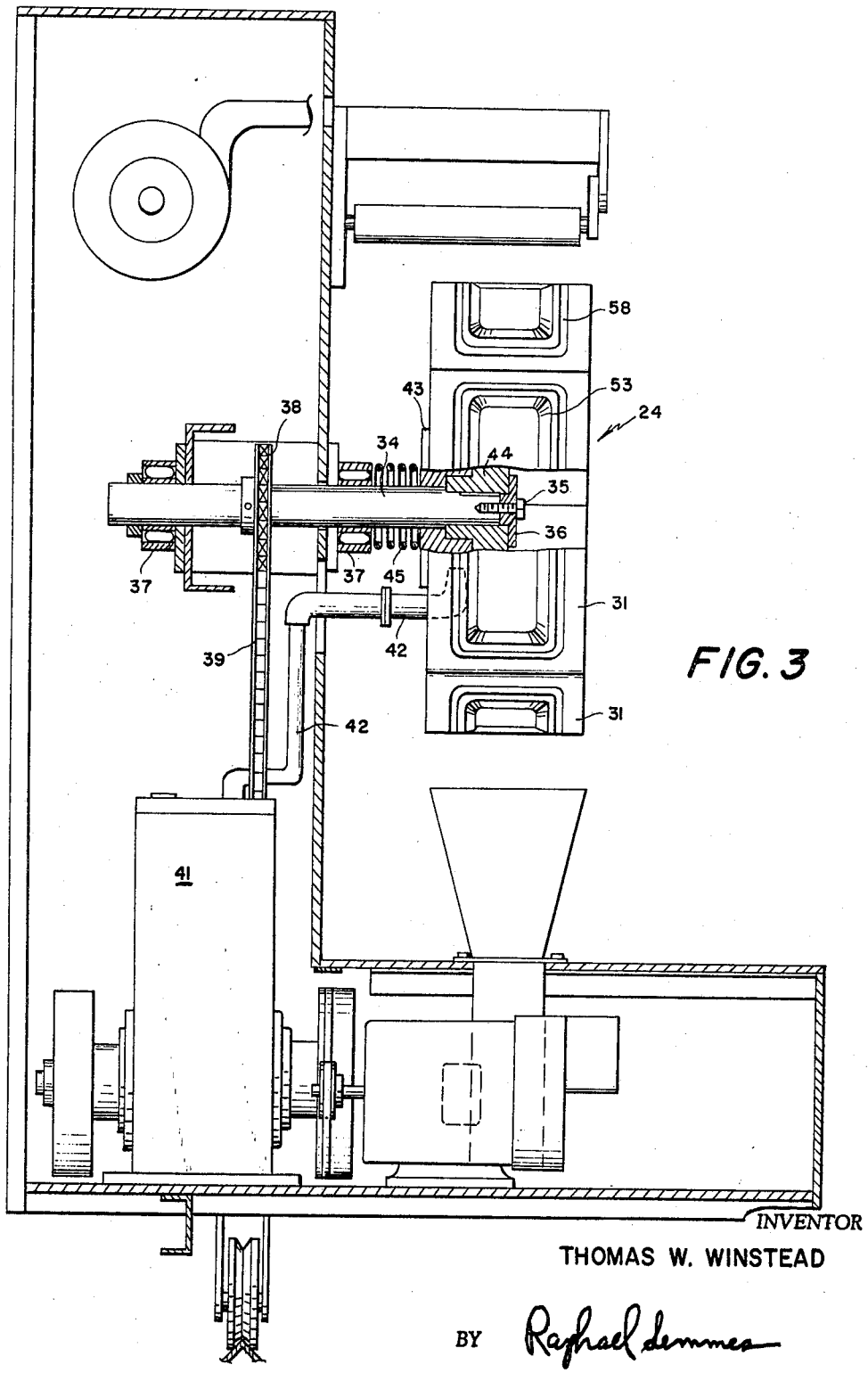
FIG. 3 is a plan view partially in section taken at right angles to the illustration in FIG. 2.

The complete cycle of the forming operation is best illustrated in FIGS. 1 and 2 where it will be seen that the sheet of foamed thermoplastic 22 is extruded from the die 20, in the manner described in my said copending application, and after expanding passes over the spreading yoke 23, from which it is directed downwardly, and tangentially engages the mold 31a across its cavity opening as the wheel 24 rotates. Here it is immediately sealed around the edges of the cavity by the vacuum groove 58. At this point, vacuum has been admitted to the arcuate slot 46 in the manifold plate 43 which continuously applies vacuum to the mold cavities as they sequentially come into registry with the arcuate slot. By the time the mold 31a has reached the point 31b at the upper end of the wheel, the vacuum has been cut off from the mold cavity and air pressure is applied from slot 51 to eject the formed article from the mold cavity.

The continuous web 22 with the formed articles 22b still engaged is tangentially stripped from the forming wheel and guided by a pair of spaced edge-engaging rollers 60 and a backing roller 61 to the cutting operation to be later described. In instances where the foamed sheet 22 is relatively stiff or thick, it is preferable to employ a crimping roller 62. This crimping roller is positioned transversely of the periphery of the forming wheel 24 and spaced upwardly therefrom so that it only engages the sheet 22 at the junctions of the respective flat molds 31. This is accomplished at the top of the wheel just as the material leaves the mold 31b and provides a hinge point across the strip which precludes deformation of the articles 22b or the edges around the articles as the web is pulled straight and tangentially from the wheel. As before indicated, some thermoplastic forms require this treatment, while others do not.

While the illustrated embodiment of the invention employs a solid shaft 34, this shaft may be hollow in order that water may be brought to the mold wheel through the appropriate rotary joints and then to the individual molds whenever water cooling is required. When foamed materials are being produced, water cooling is not particularly useful because of the poor heat transfer characteristics of low density foams and poor conductivity of such materials to the water cooled molds. Therefore, the present invention contemplates the use of air cooling by means of an air blower 63 which directs air as at 64 to the lower portion of the wheel periphery, and, if desired, it may be suitably conducted to a point adjacent the upper portion of the wheel, as at 65.

Figure 12:
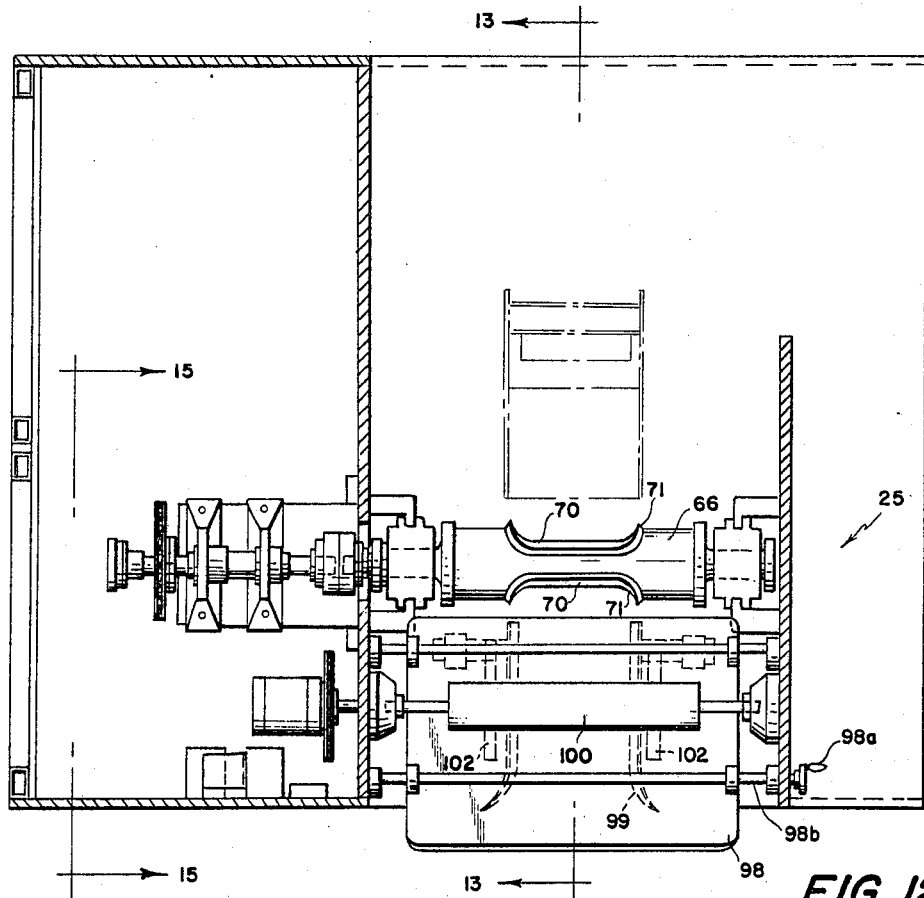
FIG. 12 is a top plan view of the article cutting unit.
Figure 11:
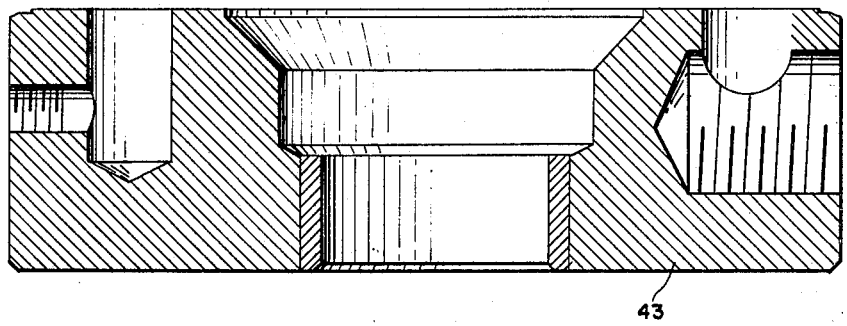
FIG. 11 is a sectional view taken on line 11—11 of FIG. 9.
Figure 13:
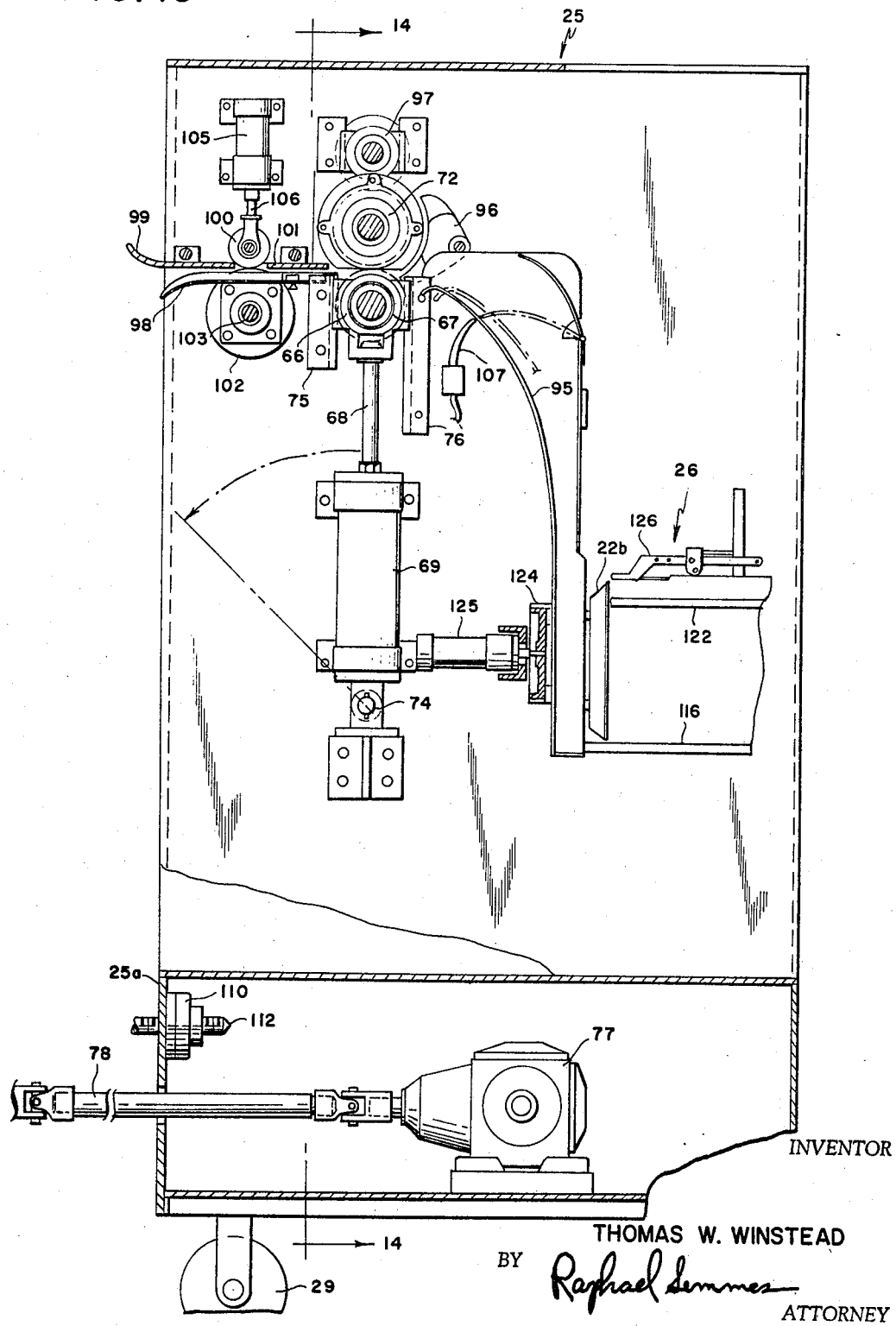
FIG. 13 is a sectional view taken on line 13—13 of FIG. 12.
Figure 14:
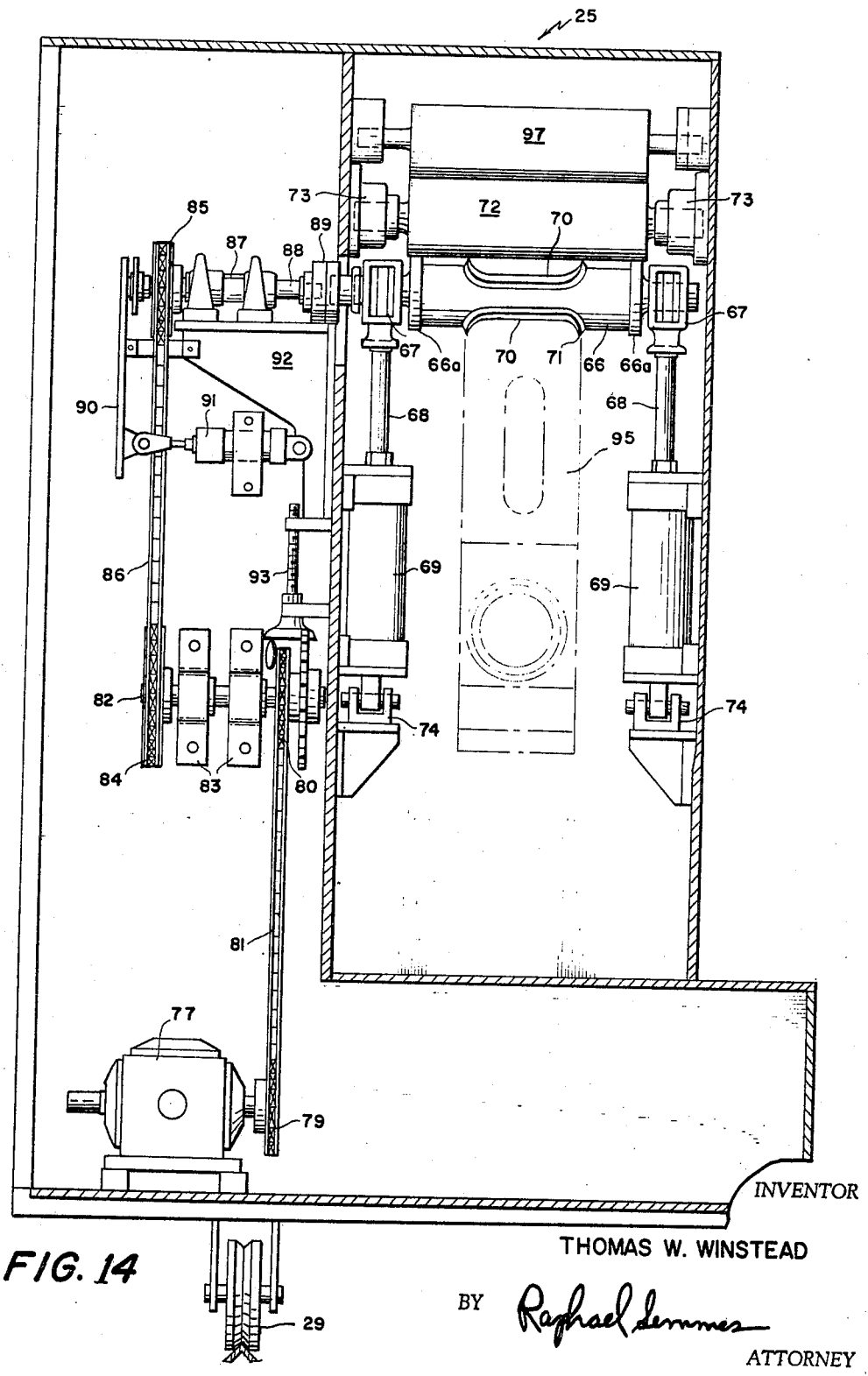
FIG. 14 is a sectional view taken on line 14—14 of FIG. 13.

Referring now to the cutting unit 25, shown in FIGS. 12 to 15, a horizontally disposed cutting roll 66 is rotatably supported at opposite ends by bearings 67 carried at the upper extremities of a pair of plunger rods 68 extending from air actuated plungers in cylinders 69. Thus, as will later appear, cutting pressure may be varied by increasing or decreasing the air pressure operating the cylinders 69. As best seen in FIGS. 12 and 14, the cutting roll 66 is provided with two radially opposed cavities 70 which are bounded by raised cutting knives 71. The cavities and cutting knives are contoured to conform to the contours of the articles which have been formed in the thermoplastic sheet 22 so that as the sheet advances between the cutting roll 66 and a backup or anvil roll 72 journalled in bearings 73, the knives 71 sever the formed articles from the selvage with the exact profile defined by the molds. As hereinafter explained, the rotation of the cutting roll 66 and the relative peripheral locations of the two sets of cutting knives are coordinated with the rotation of the forming wheel 24 so as to insure precise registry of the formed articles in the advancing sheet 22 with the cutting knives.

Figure 15:
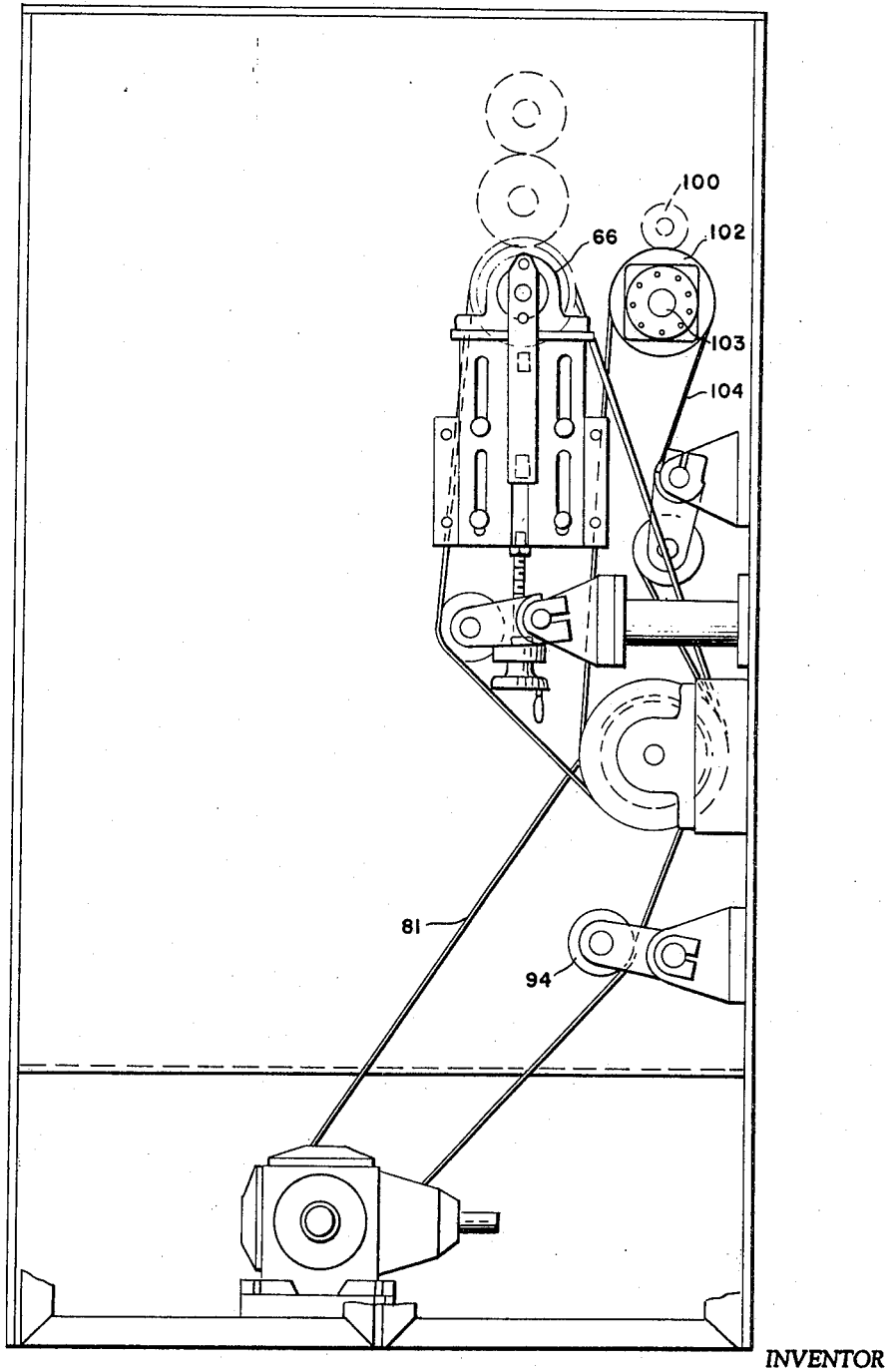
FIG. 15 is a sectional view taken on line 15—15 of FIG. 12.

The cylinders 69 are supported at their lower ends by pivotal connections 74, whereby the entire cutter roll assembly may be swung forward for rapid change of cutter roll sizes. To facilitate this operation, the bearings 67 are supported for vertical sliding movement by a pair of guide rails 75 and 76, as seen in FIG. 13. The forward guide rail 75 is shorter than the rear guide rail 76 so that when the pistons on rods 68 are drawn to the bottoms of the cylinders 69, the bearings 67 and the cutting roll 66 supported thereby can clear the guideways at the bottom of the short guideway 75 when the assembly is swung outwardly. The drive means for the cutting assembly comprises a mitered gear box 77 which, as seen in FIGS. 13 and 14, is driven by the forming wheel motor 40 through a universal telescoping shaft 78. A sprocket 79, driven by the gear box 77, rotates a sprocket 80 through sprocket chain or belt 81. The sprocket 80 is mounted at the inner end of a shaft 82, journalled in bearings 83, said shaft 82 carrying a second sprocket 84 at its outer end which is operatively connected to a sprocket 85 by a chain 86. This latter sprocket 85 drives splined shaft 87 which, in turn, drives an internal shaft 88 connected to a coupling 89. The coupling and internal shaft 88 may be moved in and out of engagement with the cutter roll 66 by means of the lever 90 which is actuated by an air cylinder 91. The entire assembly just described is mounted on a bracket 92 which may be moved vertically up or down by the handle and threaded stud 93, thereby bringing the position of the coupling 89 into line with the center of the shaft of the cutter roll 66. This permits accommodation of various sizes of cutter rolls, all of which may be driven even though their vertical center line may be at different positions. The chain 81 which connects sprocket 79 to sprocket 80 may be kept in tension by an idler 94 (FIG. 15).

As previously pointed out, the forming unit 24 and the cutting unit 25 are mounted on rollers 28 and 29 respectively, and by employing a telescoping shaft at 78, these units can be moved toward or away from one another, depending upon the timing desired.

In order to link the forming unit 24 and the cutting unit 25 together and maintain the proper spacing of the two during operation through the adjustable telescoping shaft 78, adjustable means are provided to connect the two housings of these units. As will be seen from FIGS. 2 and 13, the housing 25a of the cutting unit is provided with a pair of laterally spaced, threaded blocks 110, and, similarly, the housing 24a of the forming unit is provided with two laterally spaced, threaded blocks 111. Extending between respective pairs of blocks are threaded shafts 112, and adjacent each of the forming unit blocks 111 these shafts are provided with sprockets 113 over which a sprocket chain (not shown) is passed. Thus, the two threaded shafts 112 may be rotated together in the same direction to maintain the selected spacing adjustment of the two units. Although not shown in the drawing, a suitable hand wheel may be provided for rotating either one or the other of these connecting shafts and simultaneously rotating the other.

The formed articles 22a which are severed from the selvage after passing between the cutting roll 66 and backup roll 72 are ejected down a chute 95 and into stacking position in the stacking unit 26. The selvage from which the articles have been severed is fed by threading fingers 96, upwardly between a stripping roll 97 and the periphery of the backup roll 72 and is conducted as seen in FIG. 1 to the granulating machine 27.

To facilitate the feeding of the strip of formed articles into the cutting roll, a plate 99, associated with guide fingers 98, is provided over which the advancing strip passes. A roll 100 extends transversely across the plate 98 which is provided with an intermediate slot 101 to accommodate the periphery of the roll 100. Beneath the roll 100 two wheels 102 are carried by a shaft 103 and driven by a chain 104. These wheels operate against the roll 100, which in turn is maintained under pressure against the wheels by cylinders 105 having piston rods 106 which rotatably support the shaft of roller 100. The shaft 103 carrying the wheels is driven by an air operated slip clutch, and torque control is provided by varying the air pressure operating the slip clutch through a regulator. The surface speed of the wheels is designed to be greater than the surface speed of the cutter and backup rolls which provides a means for feeding the strip of formed articles by gripping the selvage at each edge between the roller and wheels.

When the articles are discharged from between the cutting roll and backup roll, air jets 107 (FIG. 13) may be employed to transfer the articles down a chute 95. It has been found in practice that an air jet blown across the bottom edge of a flat article, such as a tray, decreases pressure on the underside of the tray and causes it to rapidly make the transition from horizontal to vertical and descend down the chute into stacking position.

As previously stated, the forming and cutting units are mounted symmetrically on rails and wheels so that they may be moved into appropriate operating positions. The forming wheel and cutting device are linked together by the adjustable linkage system previously described, which permits proper cutting registration of the formed articles in one dimension. Registration for the other dimension is controlled by the plate 98 and the guide fingers 99 thereon, this assembly being movable from side to side by hand wheel 98a and adjusting shaft 98b, as seen in FIG. 12. The handle 98a turns the suitably threaded shaft 98b which threadedly engages the plate assembly 98.

It should be pointed out that the surface speed of the cutting roll 66 should be slightly faster than that of the forming wheel 24, thus providing a uniform and constant tension at all times. Since the forming wheel is a polygon rather than a cylinder, the relationship of its perimeter to the cutting roll must be taken into consideration. For example, a mold or forming wheel with eight cavities and a cutting roll with two cavities must be run on a four-to-one ratio basis. This relationship of revolutions must be exactly and precisely provided for by suitable gearing between the two machines. Nevertheless, the total perimeter length of the forming wheel must be somewhat shorter than four times the circumference of the cutting roll. Also, the thickness of the material must be taken into consideration and provided for in this relationship. With these perimeters properly calculated, suitable tension is maintained at all times, regardless of the relative position between the two units.

Returning to the cutting roll and referring to FIG. 14, it was previously pointed out that the knife edges 71 of the cutting roll are held firmly against the backup roll 72, and it should be additionally noted that excessive wear on the backup roll is prevented by longitudinally spaced bearing rings 66a at each end of the cutting roll. In other words, the main pressure between the cutting roll knife edge and the periphery of the backup roll is borne by the peripheral engagement of the bearing rings 66a and the backup roll 72.

A preferred form of stacking unit is illustrated in FIGS. 16–18. The unit comprises a base or support 115, the top wall of which carries a pair of centrally disposed, longitudinally extending rails 116, supported for vertical adjustment by cross-bars 117 mounted on threaded rods 118 which extend through the top wall of the base 115 and are adapted to be adjusted by a thumb screw or the like 119. A suitable number of these rail supports are provided in spaced relation along the top wall of the base to support the length of the rails 116.

On either side of the central rail assembly 116, the top wall of the base carries a series of longitudinally spaced uprights 120 which are transversely drilled to receive threaded rods 121, the opposite, inner ends of which carry side rails 122. These side rails are adjustable toward or away from one another by means of thumb screws 123. As will be seen from FIG. 13, the feeding end of the stacking unit 26 and its rails 116, 122 is located immediately adjacent the lower end of the chute 95 so as to receive the formed trays 22b which are presented to the rails on edge. By adjusting the positions of the respective rails, any size trays can be accommodated.

A plunger 124, operated by a piston and cylinder device 125, pushes the stacked trays forwardly along the rails and, preferably, a suitable counting device 126 automatically controls the number of trays to be packaged.

At the opposite end of the rails just referred to, a bagging device, generally indicated at 127, is provided for completing the packaging operation. This device comprises two laterally spaced vertical standards 128 having vertical slots 129 for slidably receiving guide pins 130 projecting from four supporting arms 131. Suitably secured to the supporting arms and projecting forwardly therefrom are four, elongated, bag supporting members 132 which, as best seen in FIG. 18, are curved in cross-section to complement the profiles of the trays fed therebetween. These bag support members are properly spaced to fit within the open end of a plastic bag or the like 133 into which the trays are advanced from the rails 116 and 122.

In order to provide for the proper horizontal adjustment of the uprights 128, their lower ends are secured to separate, relatively short angle irons 134 which are slidably secured to a long angle iron 135 by slot and pin arrangements 136. Thus, the bagging device may be adjusted laterally by the slot and pin arrangements 136 and vertically by the supporting arms 131 which are slidably supported in the vertical slots 129.

From the foregoing, it is believed that the invention may be readily understood by those skilled in the art without further description, it being borne in mind that numerous changes may be made in the details disclosed without departing from the spirit of the invention as set forth in the following claims.

I claim:

1. An integrated system for continuously manufacturing three dimensional articles from an extruded sheet of foamed thermoplastic material, comprising the following elements in combination:
   (a) a high speed extruder for extruding and expanding a continuous, flat, relatively narrow sheet of foamed thermoplastic material;
   (b) a rotatable forming wheel carrying a series of successive vacuum molds on its periphery, alinged with said extruder for successively engaging said sheet as it advances from said extruder, said forming wheel being in sufficiently close proximity to said extruder to utilize the heat of extrusion in said sheet in forming said articles;
   (c) means for rotating said wheel at a speed to accommodate said advancing sheet;
   (d) a source of vacuum, valve means actuated by the rotation of said wheel for successively evacuating the cavities of respective molds as they are presented to said sheet and for maintaining a vacuum therein for a predetermined period of the rotation of said wheel;
   (e) means for ejecting formed articles from successive molds; and (f) a cutting roller coordinated with the rotation of said wheel and the actuation of said valve means, said cutting roller having on its periphery at least one cutting edge which conforms in contour to the edge boundary of said molded three dimensional articles, for severing formed articles from said sheet.

2. Apparatus as claimed in claim 1, wherein the periphery of said forming wheel is provided with vacuum sealing means bordering the cavities of respective molds to insure the maintenance of contact of the sheet with said forming wheel.

3. Apparatus as claimed in claim 1, including means coordinating the rotation of said cutting roller with the advance of said sheet from said forming wheel to present the formed articles to the cutting roller within the confines of said cutting edge.

4. Apparatus as claimed in claim 1, including means coordinating the rotation of said forming wheel and cutting roller and providing a peripheral speed for the cutting roller which is greater than the peripheral speed of said forming wheel.

5. Apparatus as claimed in claim 1, including means interposed between the extruder and forming wheel for spreading said extruded and expanding sheet.

References Cited

UNITED STATES PATENTS

| | | |
|---|---|---|
| 1,750,708 | 3/1930 | Edwards. |
| 1,797,568 | 3/1931 | Dean. |
| 2,490,781 | 12/1949 | Cloud. |
| 3,162,077 | 12/1964 | Brümmer. |

WILLIAM J. STEPHENSON, Primary Examiner

U.S. Cl. X.R.

18—21; 83—673, 914; 264—51, 321